US006105748A

United States Patent [19]

Pallinger et al.

[11] Patent Number: 6,105,748

[45] **Date of Patent: *Aug. 22, 2000**

[54] ESCALATOR OR TRAVELLING WALKWAY WITH UNDERNEATH BRACING

[75] Inventors: Reinhard Pallinger; Gerhard Lunardi, both of Vienna, Austria

[73] Assignee: Inventio AG, Hergiswil, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 09/039,715

[22] Filed: Mar. 16, 1998

[30] Foreign Application Priority Data

Mar. 17, 1997 [EP] European Pat. Off. .............. 97810154

[51] Int. Cl.[7] ..................................................... B65G 15/00

[52] U.S. Cl. ............................................ 198/321; 198/335

[58] Field of Search .................................... 198/321, 326, 198/335

[56] References Cited

U.S. PATENT DOCUMENTS

| | | | |
|---|---|---|---|
| 3,707,220 | 12/1972 | Boltrek et al. | 198/16 |
| 4,260,318 | 4/1981 | Holritz et al. | 198/589 |
| 5,273,415 | 12/1993 | Jackson | 425/62 |

FOREIGN PATENT DOCUMENTS

| | | | |
|---|---|---|---|
| 709291 | 7/1941 | Germany | 35/6 |
| 2640188 | 9/1976 | Germany | B66B 9/12 |
| 8127847 | 10/1985 | Germany | B66B 9/18 |
| 404148790 | 5/1992 | Japan | 198/321 |

*Primary Examiner*—Christopher P. Ellis
*Assistant Examiner*—Khoi H. Tran
*Attorney, Agent, or Firm*—Schweitzer Cornman Gross & Bondell LLP

[57] ABSTRACT

An escalator or travelling walkway, which connects a first story with a second story, has plates forming a walkway for conveying persons and objects. The travelling walkway is laterally bounded by balustrades. Each balustrade carries a moving handrail which advances at the speed of the plates. A balustrade pedestal supports the balustrades. Serving as a support for the plates are one or more support bodies having a beam lower edge, at which underneath bracing is arranged. The bracing may be in the form of tie rods, connected to ends of the support bodies and to the middle of the support bodies by a central support.

7 Claims, 3 Drawing Sheets

ESCALATOR OR TRAVELLING WALKWAY WITH UNDERNEATH BRACING

The present invention relates to an escalator or travelling walkway consisting of a balustrade with a handrail, a balustrade pedestal, steps or plates for the transport of persons or objects, and support bodies and guide carriers with guides for the steps or plates and the handrail.

BACKGROUND OF THE INVENTION

There has become known from laid-open German patent specification DE 2 640 188 a frame for an escalator, in which an I-beam at each side serves as a longitudinally extending main frame member. Transverse beams and connecting members join the main frame members, forming a main frame of a boxlike construction with solid wall beams.

A disadvantage of structures having a main frame having solid wall beams is that, since the required bending stiffness must increase with an increasing span width, the main frame weight must be of proportionally greater weight to maintain the stiffness. This undesired increase in weight per meter also concerns, for example, outer facing elements for the structure. This increasing relationship places an upper limit on possible span width.

The present invention, avoids the disadvantages and limitations of the prior art and yields an escalator or travelling walkway with a constant weight per meter over a wide range of span widths. In accordance with the invention, the support bodies for the escalator or walkway are provided with underneath bracing members separated from the support bodies, and joined thereto at intervals along the length of the support bodies. The advantages of such a construction include the ability of the main support to retain its constructional height with increasing span width. Thus, escalators or travelling walkways can be constructed with an elegant, slender and light outward appearance, notwithstanding large span widths. Moreover, due to the present construction, material savings result at, for example, the main support and outer facing elements.

BRIEF DESCRIPTION OF THE DRAWINGS

The present invention is more fully explained in the following detailed description of embodiments, when taken in association with the annexed drawings, wherein.

DETAILED DESCRIPTION OF THE INVENTION

Figure 1:
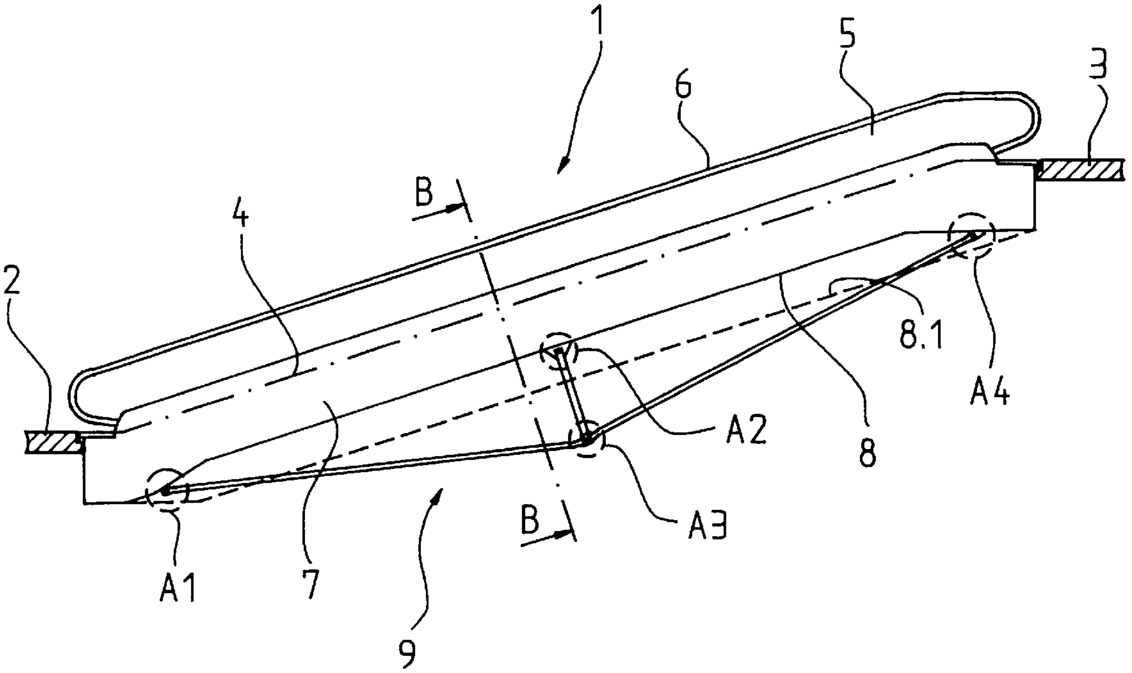
FIG. 1 shows a side elevation view of a travelling walkway with a singly-supported underneath bracing in accordance with the present invention.
Figure 2:
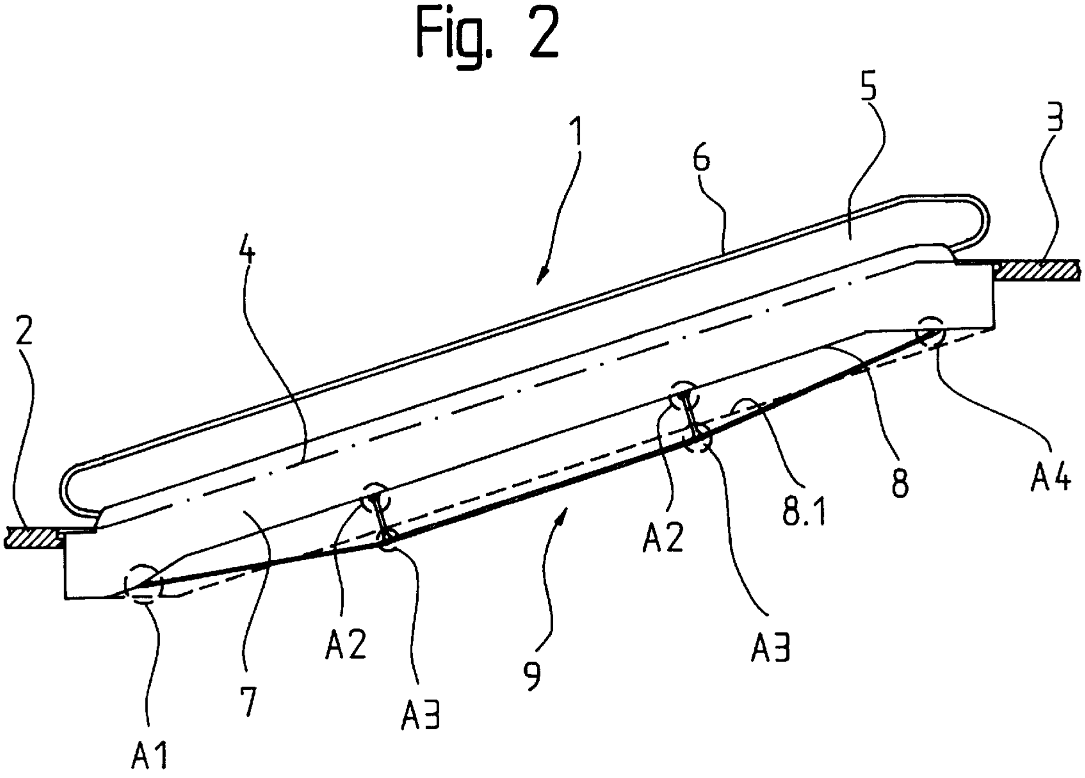
FIG. 2 shows a side elevation view of a travelling walkway with a doubly-supported underneath bracing.

A travelling walkway which connects a first level or storey 2 with a second storey 3 is designated by 1 in the Figures. Plates 4 forming a walkway are provided in a known manner as a conveying means for persons and objects upon the walkway. In the case of an escalator, steps serve as the transport means in place of the plates 4. The travelling walkway is bounded laterally by balustrades 5, which may be of glass or other material as known. Each balustrade 5 supports a moving handrail 6, which advances at the speed of the plates 4. A pair of support bodies 7 serves as a support means for the plates 4 or steps, and has beam lower edges 8 to which underneath bracing 9 is connected at intervals. In FIGS. 1 and 2 the lower edge of a corresponding beam for a travelling walkway without underneath bracing as utilized in the present invention is shown in phantom and is designated by reference numeral 8.1. Such a lower edge can be seen to exhibit a cumbersome and bulky construction for a corresponding span width and load-bearing capacity.

Figure 3:
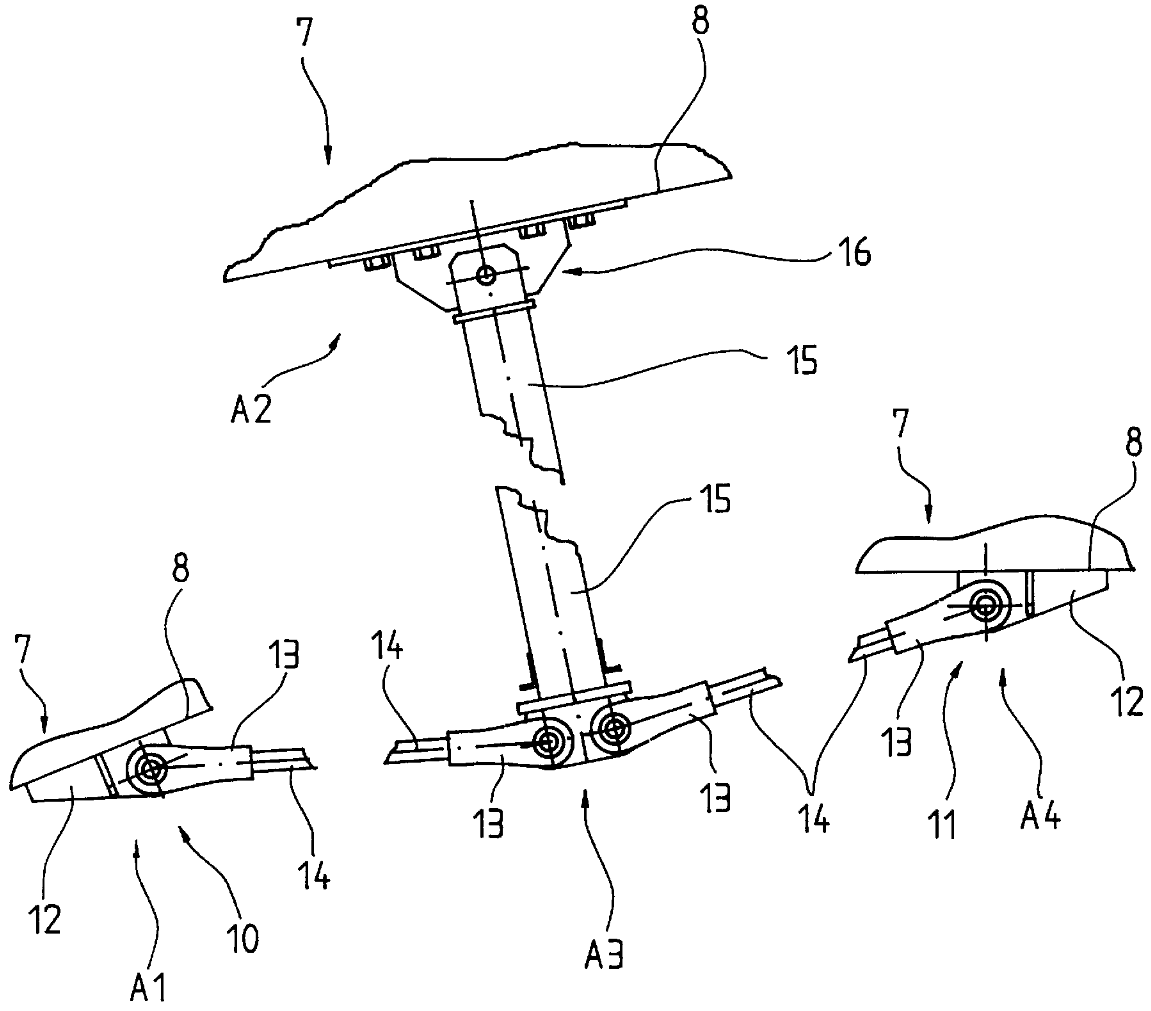
FIG. 3 is a detailed view of the underneath bracing.

In FIG. 3, numerals Al–A4 reference portions of the underneath bracing 9 of the present invention. As shown, portion Al presents a lower end fastening 10 of the underneath bracing 9 to the support body 7, while an upper end fastening 11 of the underneath bracing 9 to the support body 7 is illustrated in portion A4. The fastenings 10, 11 each have a web plate 12 which is connected with the support body 7 and to which a tensioning fastener 13 of a tie rod 14 or cable is arranged. Portion A3 shows the other end of the tie rods 14 with similar tensioning fasteners 13 are coupled to a central support 15. Portion A2 shows the other, upper end of the central support 15, which is connected to the support body 7 by means of a support bearing 16. The travelling walkway shown in FIG. 1 has one support 15 at each beam lower edge 8, while the travelling walkway shown in FIG. 2 has two supports 15 at each beam lower edge 8.

Figure 4:
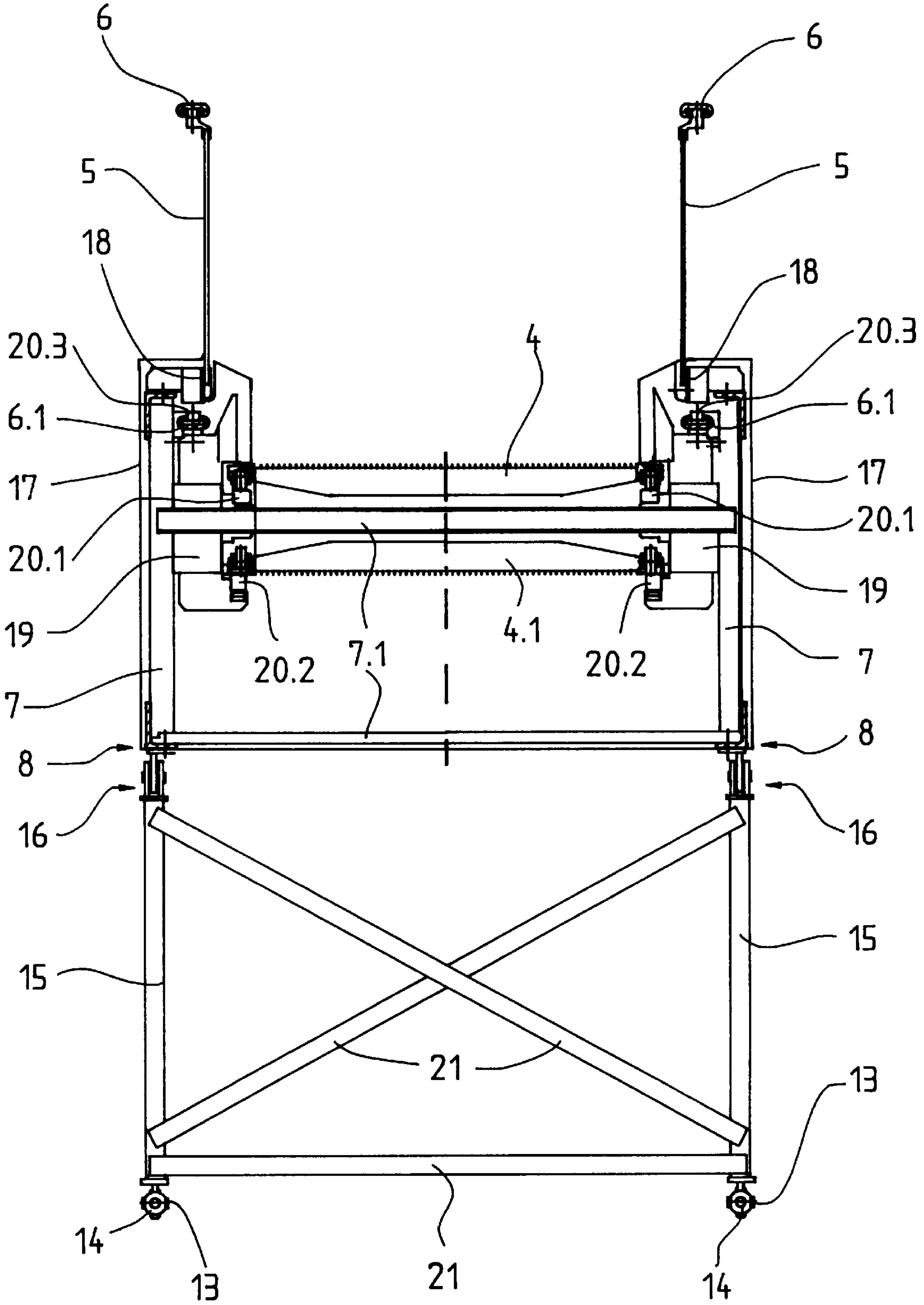
FIG. 4 is a section view taken along line B—B of FIG. 1.

FIG. 4 shows a cross-section of the travelling walkway 1 with respective underneath bracing 9 arranged at each beam lower edge 8. Transverse webs 7.1 connect the lefthand support body 7 with the righthand support body 7. An outer facing 17, a balustrade pedestal 18 and a guide carrier 19 are arranged at each of the support bodies. Each of the guide carriers 19 has first guides 20.1 for the leading or passenger/object-carrying plates 4, second guides 20.2 for the returning plates 4.1, and third guides 20.3 for the returning handrail 6.1. The supports 15 of the underneath bracings 9 arranged below the support body 7 at each beam lower edge 8 are connected by means of cross struts 21.

We claim:

1. An installed and operational escalator or travelling walkway comprising a balustrade, a handrail at least partially supported by said balustrade, a balustrade pedestal supporting the balustrade, means for the transport of persons and objects bounded on a lateral edge by the balustrade, and a support body formed as a separate structure from the balustrade pedestal coupled to the balustrade pedestal having guide carriers with guides below the balustrade for the transport means and the handrail, and at least one underneath bracing located below the support body and coupled solely at spaced intervals to the support body.

2. An escalator or travelling walkway according to claim 1, wherein the underneath bracing comprises at least one support extending downwardly from the support body intermediate from ends thereof, a first tensioning element connected between a first end of the support body and one of said at least one downward-extending supports, and a second tensioning element connected between a second end of the support body and one of said at least one downward-extending supports.

3. An escalator or travelling walkway according to claim 2, wherein the first and second tensioning elements comprise at least one of tie rods and cables.

4. An escalator or travelling walkway according to claim 3, wherein the first and second tensioning elements are connected to the support body by means of a tensioning fastener and are connected to the support by means of a tensioning fastener.

5. An escalator or travelling walkway according to claim 2, wherein the downwardly-extending supports each have a first end connected the support body by means of a support bearing.

6. An escalator or travelling walkway according to claim 2, wherein the support body includes a beam lower edge and the underneath bracing is arranged and located at the beam lower edge.

7. An escalator or travelling walkway according to claim 6 further comprising a second support body spaced from the first support body and extending parallel thereto and having at least one downwardly-extending support, the downwardly-extending supports for the first and second support bodies being interconnected by cross struts extending therebetween.

* * * * *